(12) United States Patent
Barnes et al.

(10) Patent No.: US 11,181,244 B2
(45) Date of Patent: Nov. 23, 2021

(54) LIGHTING ASSEMBLY

(71) Applicant: HEWLETT-PACKARD DEVELOPMENT COMPANY, L.P., Spring, TX (US)

(72) Inventors: Arthur H Barnes, Vancouver, WA (US); William Winters, Sumner, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/607,482

(22) PCT Filed: Mar. 26, 2018

(86) PCT No.: PCT/US2018/024358
§ 371 (c)(1),
(2) Date: Oct. 23, 2019

(87) PCT Pub. No.: WO2019/190461
PCT Pub. Date: Oct. 3, 2019

(65) Prior Publication Data
US 2020/0141548 A1    May 7, 2020

(51) Int. Cl.
*F21S 8/04*     (2006.01)
*F21V 7/00*     (2006.01)
*B29C 64/286*   (2017.01)
*B29C 64/282*   (2017.01)
*F21Y 103/00*   (2016.01)

(52) U.S. Cl.
CPC ............ *F21S 8/046* (2013.01); *B29C 64/286* (2017.08); *F21V 7/005* (2013.01); *B29C 64/282* (2017.08); *F21Y 2103/00* (2013.01)

(58) Field of Classification Search
CPC .......... F21S 8/046; F21V 11/12; F21V 11/16; F21V 7/005; F21Y 2103/00
See application file for complete search history.

(56) References Cited

U.S. PATENT DOCUMENTS

| 2,864,939 | A |   | 12/1958 | Marcus et al. |
| 5,399,523 | A |   | 3/1995  | Kakoschke |
| 6,046,826 | A | * | 4/2000  | Lu ...................... H04N 1/02815 313/114 |
| 7,352,510 | B2 |  | 4/2008  | Cummings et al. |
| 7,912,359 | B2 |  | 3/2011  | Suzuki et al. |
| 8,419,219 | B2 |  | 4/2013  | Yamamoto |
| 2005/0190248 | A1 | * | 9/2005 | Konno .................. B41J 11/002 347/102 |
| 2007/0153074 | A1 | * | 7/2007 | Anderson ............. B41J 11/002 347/102 |
| 2008/0239751 | A1 |   | 10/2008 | Chang |

(Continued)

FOREIGN PATENT DOCUMENTS

CN        101315867 A      12/2008

*Primary Examiner* — Leah Simone Macchiarolo
(74) *Attorney, Agent, or Firm* — Dierker & Kavanaugh PC

(57) ABSTRACT

In one example, a lighting assembly includes a housing to hold an elongated lamp and an elongated device attached to or integral with the housing and configured to, when an lamp is held in the housing, convert light from the lamp having a first irradiance that is non-uniform along a length into light having a second irradiance that is uniform along the length.

11 Claims, 11 Drawing Sheets

(56) References Cited

U.S. PATENT DOCUMENTS

| | | | |
|---|---|---|---|
| 2009/0073232 A1* | 3/2009 | Nakata | B41J 11/002 |
| | | | 347/51 |
| 2009/0103905 A1 | 4/2009 | Tanino et al. | |
| 2014/0110887 A1 | 4/2014 | Horiuchi | |
| 2016/0184925 A1* | 6/2016 | Huang | B23K 26/0626 |
| | | | 419/53 |
| 2016/0318129 A1* | 11/2016 | Hu | B29C 64/282 |
| 2017/0305066 A1 | 10/2017 | Nauka et al. | |
| 2018/0207750 A1* | 7/2018 | Carter | B29C 64/153 |

* cited by examiner

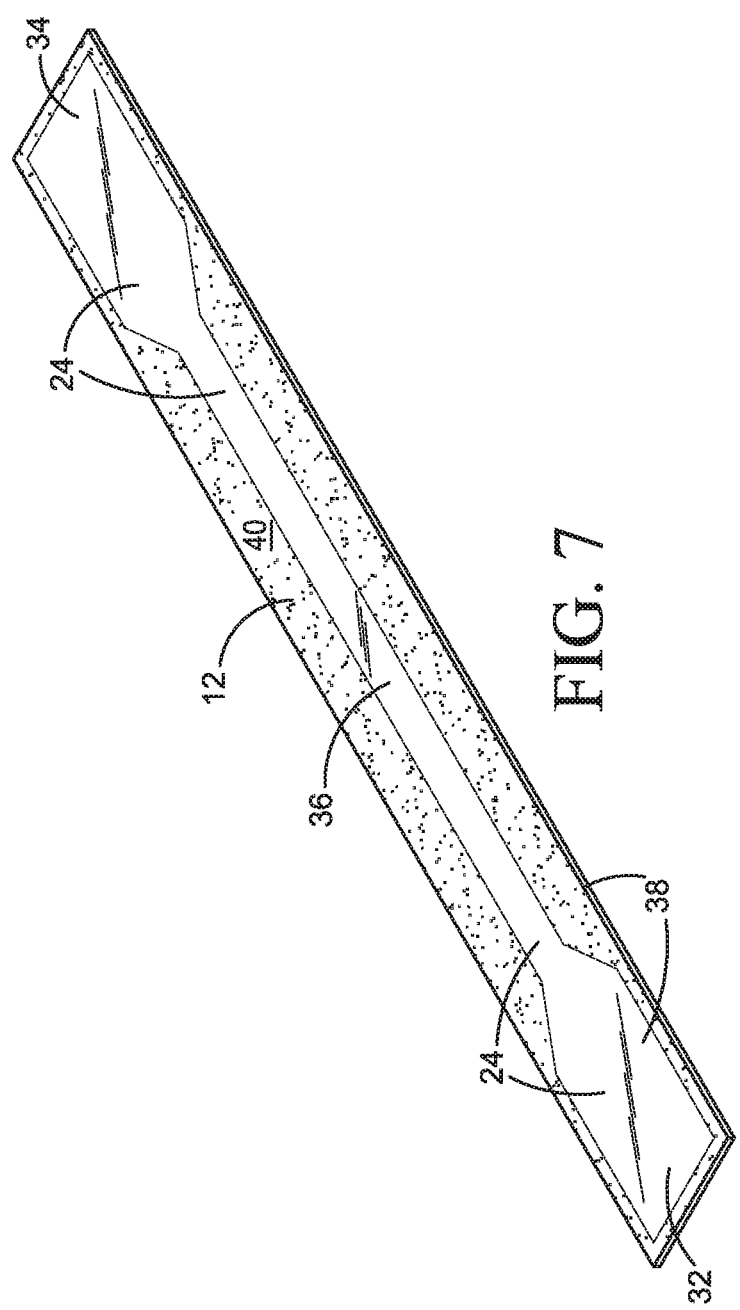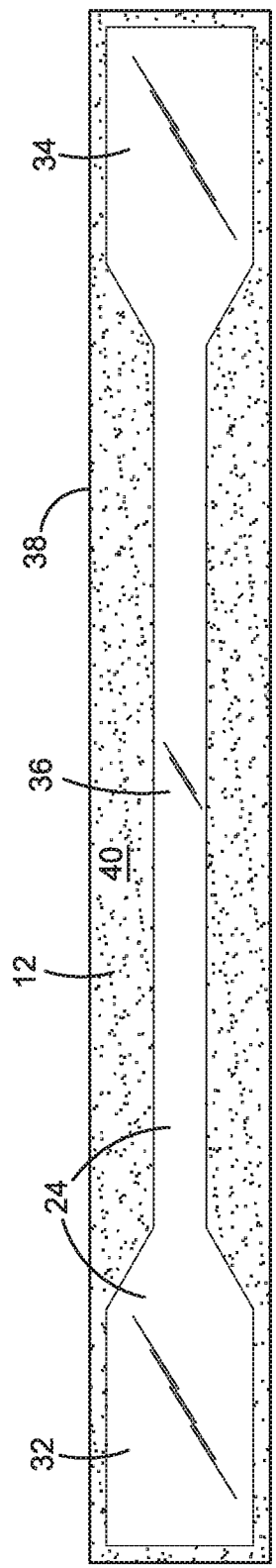

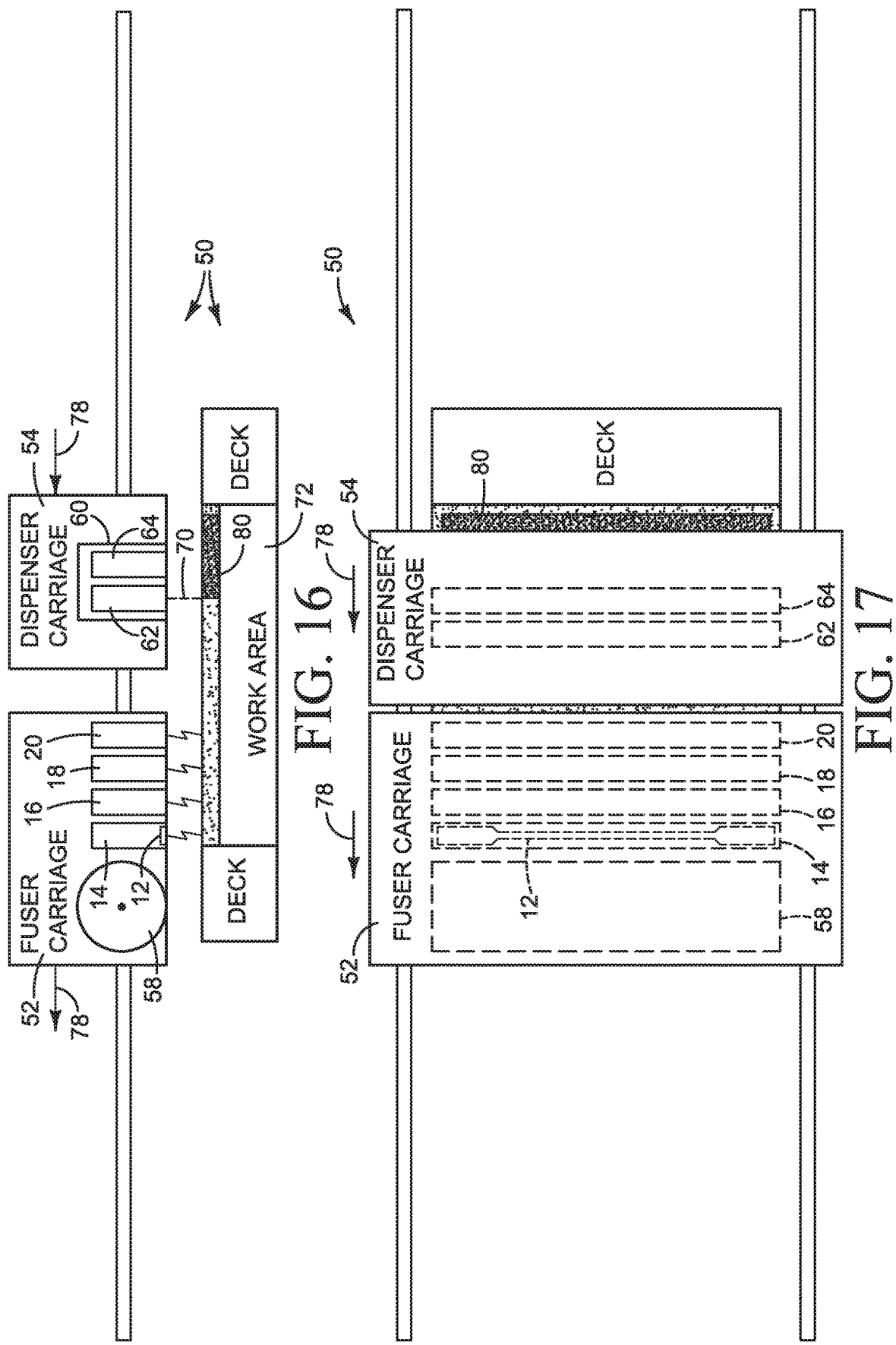

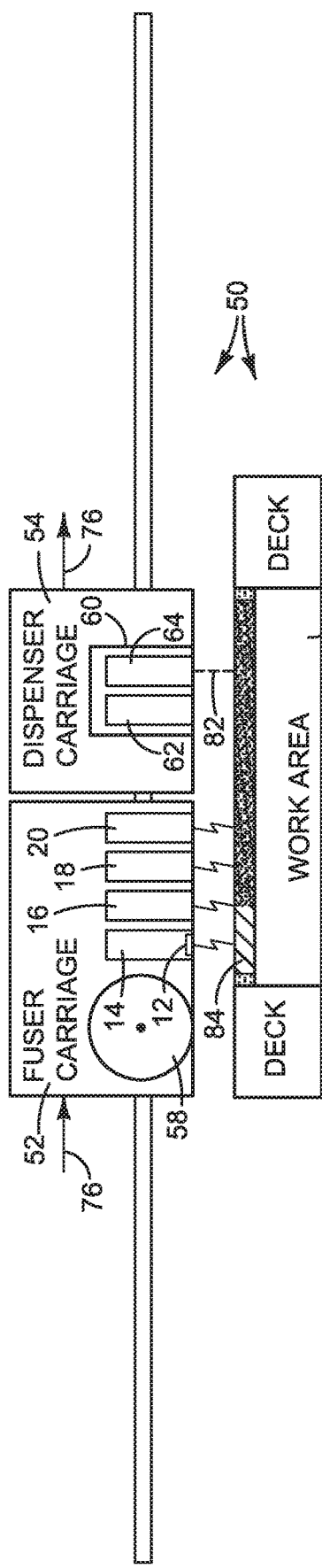

LIGHTING ASSEMBLY

BACKGROUND

Additive manufacturing machines produce 3D objects by building up layers of material. Some additive manufacturing machines are commonly referred to as "3D printers." 3D printers and other additive manufacturing machines make it possible to convert a CAD (computer aided design) model or other digital representation of an object into the physical object. The model data may be processed into slices defining that part of a layer or layers of build material to be formed into the object.

DRAWINGS

FIGS. 1 and 2 are isometric and plan views, respectively, illustrating a lighting assembly implementing one example of a light baffle.

FIGS. 3 and 4 are section views alone the lines 3-3 and 4-4 in FIG. 2.

FIGS. 7 and 8 are isometric and plan views, respectively, illustrating another example of a light baffle.

Figure 1:
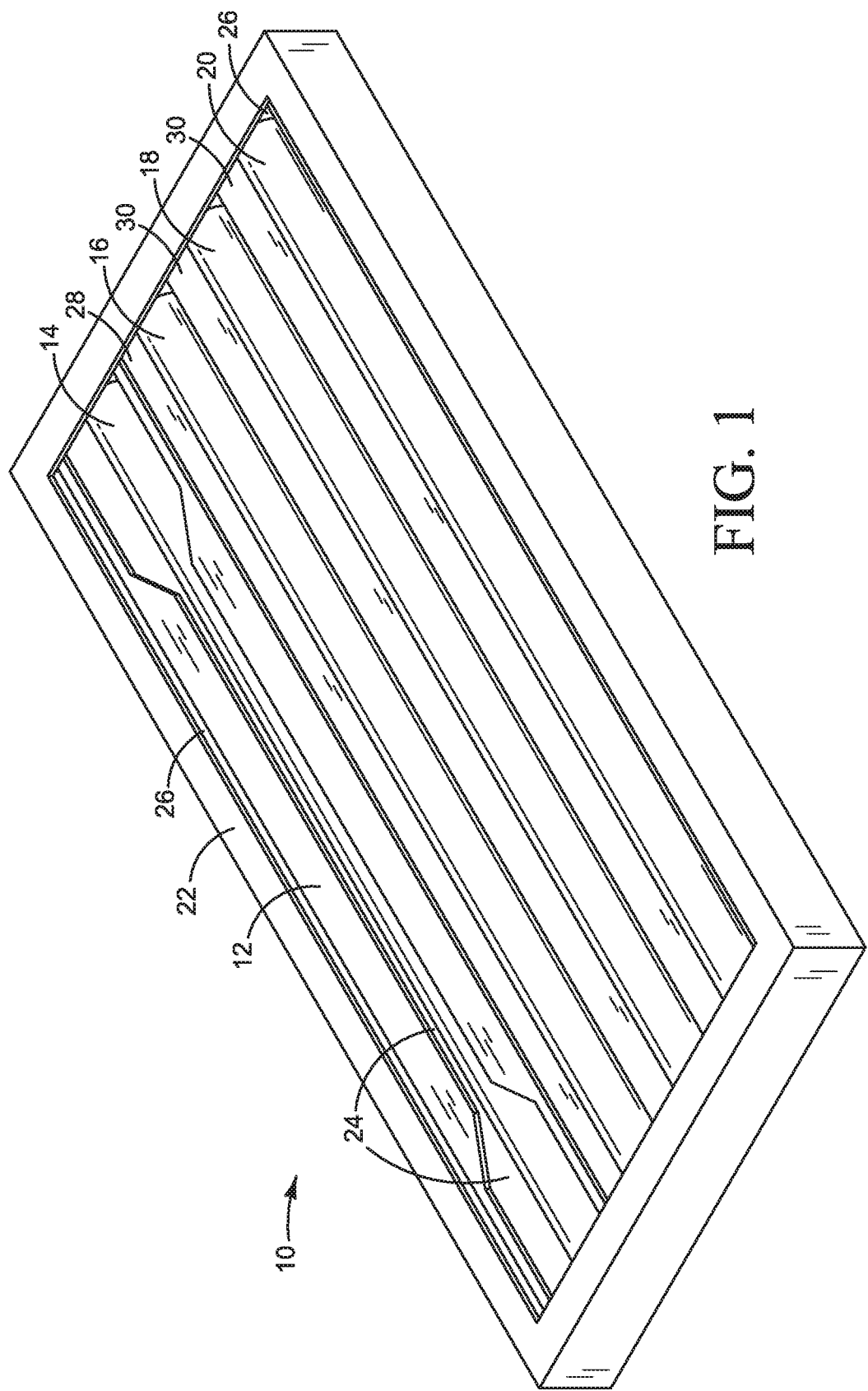
Figure 2:
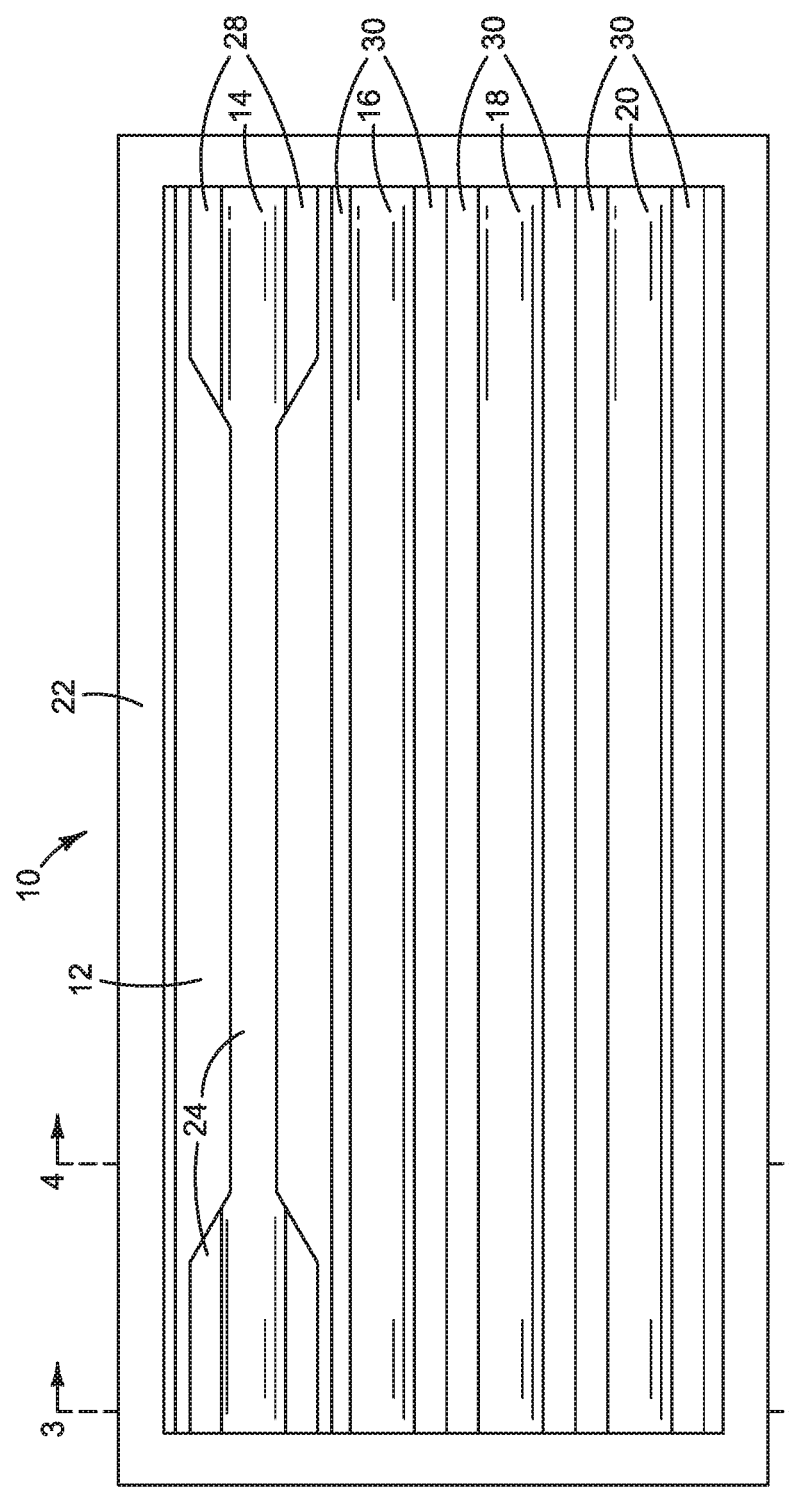
Figure 3:
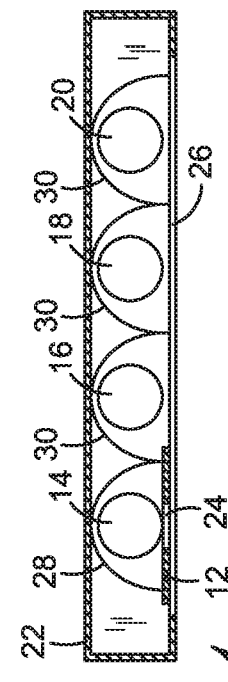
Figure 4:
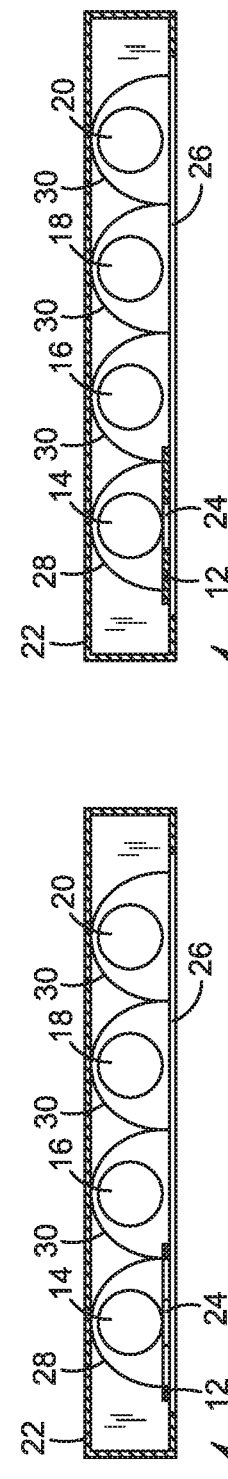

FIGS. 12-21 present a sequence of elevation and plan views showing an example fusing process for an additive manufacturing machine implementing a lighting system such as that shown in FIGS. 1-4.

The same part numbers designate the same or similar parts throughout the figures. The figures are not necessarily to scale.

DESCRIPTION

In some additive manufacturing processes, heat is used to sinter, melt, bind, or otherwise fuse together the particles in a powdered build material to form a solid object. Heat to fuse the build material powder may be generated by treating the powder with a liquid fusing agent and then irradiating the treated material with a fusing lamp. Liquid fusing agent is applied to a thin layer of powdered build material in a pattern based on the corresponding object slice and then irradiated with the fusing lamp. Light absorbing components in the fusing agent absorb light energy from the fusing lamp. Radiant heat output by the fusing lamp together with heat generated internally by the light absorbing components in the fusing agent fuses the build material. The process is repeated layer by layer and slice by slice to complete the object.

In some additive manufacturing processes, a warming lamp is also used to help pre-heat untreated build material powder to a target temperature. Quartz infrared halogen lamps may be used for both warming and fusing. It is desirable for some build material powders commonly used in 3D printing, polyamide 12 (PA 12) for example, to use a lower color temperature warming lamp and a higher color temperature fusing lamp. Untreated PA 12 build material powder absorbs more light energy (for pre-heating) in the mid and far regions of the infrared spectrum compared to the near infrared region. For preheating PA 12 powder, for example, an 1800K quartz infrared halogen lamp is significantly more efficient than a 2700K lamp because more of its power distribution is in the mid and far regions of the infrared spectrum where the powder is more absorptive.

A more densely wound filament may be used in a lower color temperature quartz infrared halogen lamp to achieve the desired irradiating power. A densely wound filament, however, may irradiate the build material powder non-uniformly along the length of the lamp. Accordingly, a new device has been developed to convert a light emission with a non-uniform irradiance into a uniform irradiance on the build material powder or other target surface. The conversion may be effected by narrowing the exposure window to flatten the irradiance curve. The device may be implemented, for example, with a baffle positioned between the lamp and the target surface and a reflector covering the lamp so that substantially all of the light emitted by the lamp is directed toward the baffle either directly from the lamp or indirectly by the reflector. The baffle forms an elongated exposure window that defines the opening through which light from the lamp passes to the target surface. The area covered by the opening is constant along the length of the lamp, or along at least so much of the length of the lamp for which it is desired to have a uniform irradiance. In one example, the baffle forms a dumbbell shaped opening so that the irradiance is greater at each end of the exposure window to compensate for heat losses that can occur along the sides of a work area.

These and other examples described below and shown in the figures illustrate but do not limit the scope of the patent, which is defined in the Claims following this Description.

As used in this document: "elongated" means the length is greater than the width; "irradiance" means the power received by a surface per unit area (usually measured in $W/cm^2$); "radiant exposure" means the radiant energy received by a surface per unit area, which is the irradiance over time (usually measured in $J/cm^2$); "light" means electromagnetic radiation of any wavelength; and an "opening" for light to pass means an area transparent to the light.

FIGS. 1-4 illustrate a lighting assembly 10 implementing one example of a baffle 12. Baffle 12 is shown separately in FIGS. 5 and 6. Referring to FIGS. 1-4, lighting assembly 10 includes baffle 12 and lamps 14, 16, 18, and 20 in a housing 22. Lamp 14 is exposed through an opening 24 in baffle 12. Lamps 16, 18, and 20 are exposed through an opening 26 in housing 20. As noted above, an "opening" in this context means an area that is transparent to the light from the respective lamp or lamps emitting light through the opening. An opening 24, 26 forms an exposure window that may be an area of empty space or an area of material that is transparent to light emitted by the corresponding lamp or lamps.

Baffle 12 may be integral to housing 22 or a discrete part attached to housing 22. For a lighting assembly 10 implemented as part of a fusing carriage in an additive manufacturing machine, described below with reference to FIGS. 12-21, housing 22 is oriented face down so that lamps 14-20 emit light through openings 24, 26 to irradiate build material in a work area beneath assembly 10. Lighting assembly 10 also includes a reflector 28 covering lamp 14 so that substantially all of the light emitted by lamp 14 is directed toward the target surface through opening 24 in baffle 12. Lighting assembly 10 also includes a reflector 30 covering each lamp 16-20 so that substantially all of the light emitted by the corresponding lamp is directed toward the target surface through opening 26. In this example, each reflector 28, 30 forms a dome surrounding a corresponding lamp 14, 16-20 inside housing 22.

Figure 5:
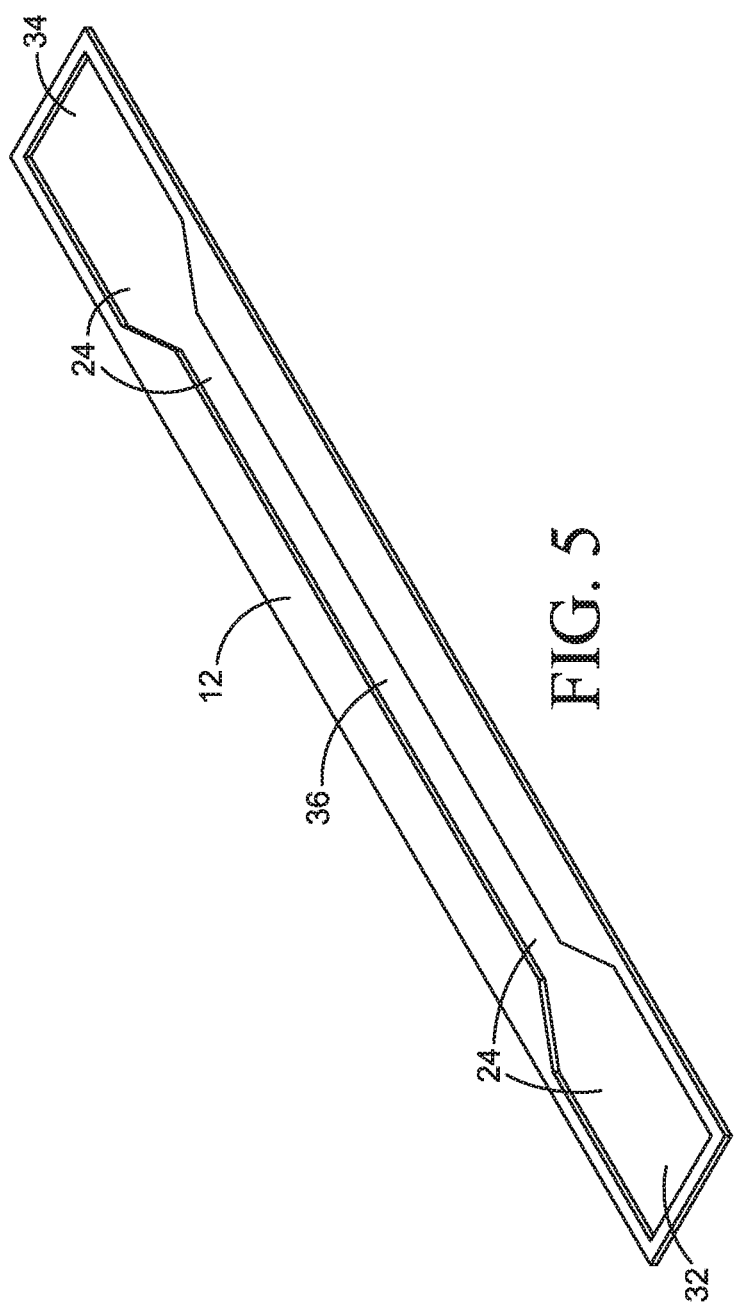
FIGS. 5 and 6 are isometric and plan views, respectively, of the example light baffle implemented in the lighting assembly shown in FIGS. 1-4.
Figure 6:
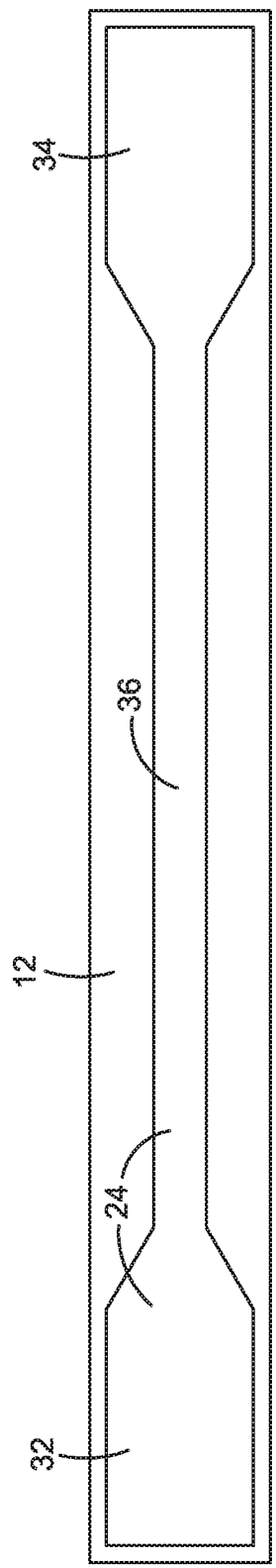

Referring now also to FIGS. 5 and 6, in this example baffle 12 forms a dumbbell shaped opening 24 wider at each end 32, 34 and narrower along the middle 36. Baffle 12 passes a greater amount of light at each end 32, 34 with a higher irradiance and a lesser amount of light along middle 36 with a lower irradiance. In one example, the inside of baffle 12 facing lamp 14 is made of a reflective material to reflect light from lamp 14 into reflector 28 to help direct as much light as possible through opening 24.

In another example, shown in FIGS. 7 and 8, baffle 12 includes a transparent plate 38 with a reflective coating 40 that defines opening 24.

Figure 9:
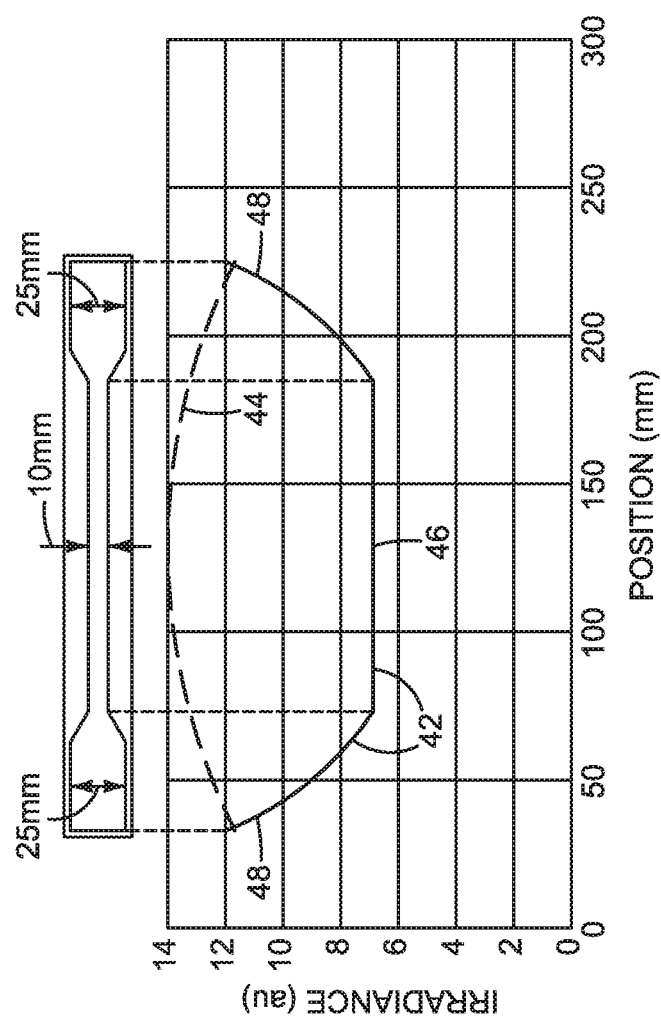
FIG. 9 is a graph illustrating one example of the irradiance of light passing through the baffle shown in FIGS. 1-6 along the length of the baffle opening.

FIG. 9 is a graph illustrating one example of the irradiance of the light passing through a baffle 12 along the length of opening 24. The vertical axis in FIG. 9 indicates irradiance in arbitrary units and the horizontal axis indicates position along opening 24 in millimeters for a baffle opening that is 10 mm wide along middle part 36 and 25 mm wide at each end 32, 34. The actual value of the irradiance may vary depending on the characteristics of lamp 14. Referring to FIG. 9, the irradiance of light emitted by lamp 14 passing through baffle 12 is depicted by a solid line 42 and the irradiance of light emitted by a lamp 14 without a baffle 12 is depicted by a dashed line 44. The irradiance is uniform along the middle part 36 of opening 24, as indicated by the linear part 46 of line 38, flattening the non-uniform irradiance of unbaffled light shown by line 40. The irradiance increases at each end 32, 34, as indicated by the rising curve parts 48 of line 38.

Where lighting assembly 10 is implemented in a scanning carriage, as described below with reference to FIGS. 12-21, the radiant exposure and thus the heat delivered to the work area will be constant along the middle part 36 of baffle opening 24. The radiant exposure and thus the heat delivered to the work area increases to a higher level at each end 32, 34 of opening 24, along the sides of a work area for example, both due to the higher irradiance and because those parts of the work area under the larger part of the opening experience a longer exposure time.

Figure 10:
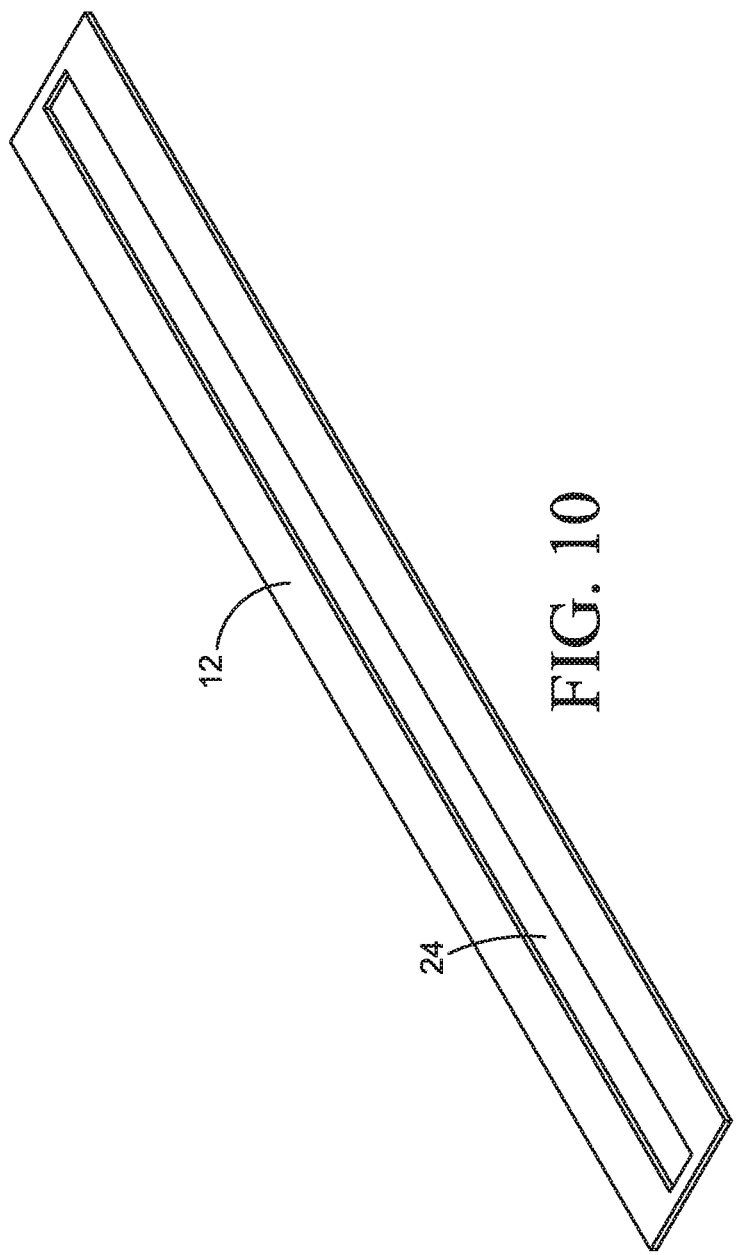
FIGS. 10 and 11 are isometric and plan views, respectively, illustrating another example of a light baffle.
Figure 11:
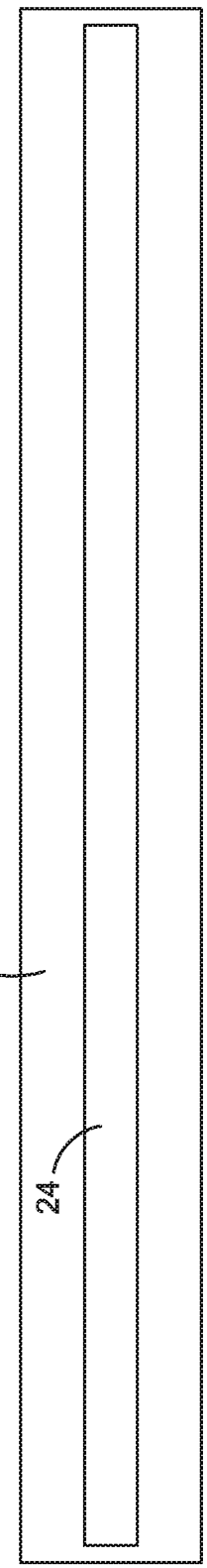

In another example, shown in FIGS. 10 and 11, baffle 12 includes an opening 24 that is uniform along the full length of the opening. A uniform opening 24 may be desirable, for example, to achieve a constant heating profile across the entire work area.

Figure 12:
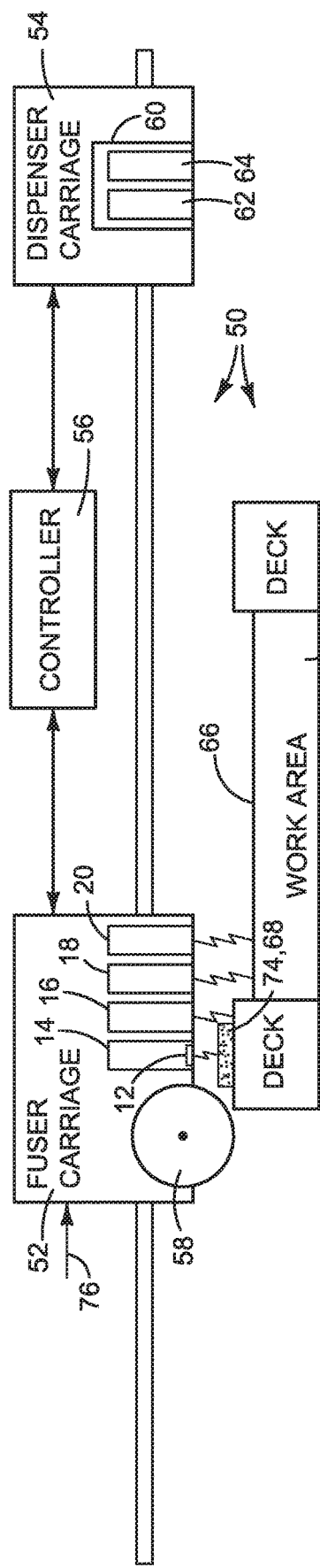
Figure 13:
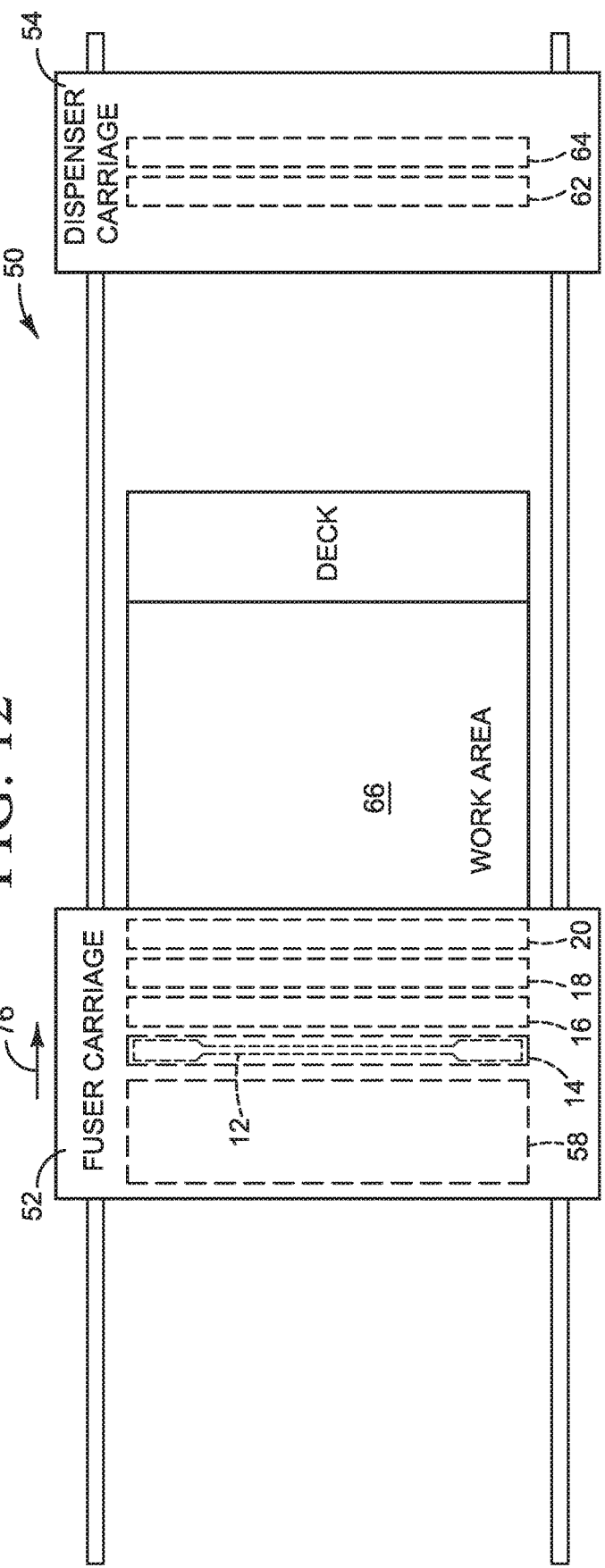

FIGS. 12-21 present a sequence of elevation and plan views showing an example fusing process for an additive manufacturing machine implementing a lighting system such as that shown in FIGS. 1-4. Referring to FIGS. 12 and 13, a fusing system 50 includes a first, "fuser" carriage 52 and a second, "dispenser" carriage 54. Carriages 52 and 54 move back and forth over a work area 66 at the direction of a controller 56. Controller 56 represents the processing and memory resources and the instructions, electronic circuitry and components needed to control the operative elements of system 50.

In this example, fuser carriage 52 carries a layering device 58, a lighting assembly 10 such as that shown in FIGS. 1-4 that includes a baffle 12 for a warming lamp 14, and a group of three fusing lamps 16, 18, and 20. Dispenser carriage 54 carries an inkjet printhead assembly or other suitable liquid dispensing assembly 60 to dispense a liquid fusing agent. In the example shown, dispensing assembly 60 includes a first dispenser 62 to dispense a fusing agent and a second dispenser 64 to dispense a detailing agent. A "fusing agent" means a substance that causes or helps cause a build material to sinter, melt, bind or otherwise fuse. A "detailing agent" means a substance that inhibits or prevents or enhances fusing a build material, for example by modifying the effect of a fusing agent and cooling the build material. According to one example, a suitable fusing agent may be an ink-type formulation comprising carbon black, such as, for example, the fusing agent formulation commercially known as V1Q60Q "HP fusing agent" available from HP Inc. In one example, such a fusing agent may additionally include an infra-red light absorber. In one example, such an ink may additionally include a near infra-red light absorber. According to one example, a suitable build material may be PA12 build material commercially known as V1R10A "HP PA12" available from HP Inc.

In the example shown, layering device 58 is implemented as a roller that may rotate freely as it is moved over a work area 66, freewheeling clockwise or counter-clockwise depending on the direction of travel, or roller 58 may be driven rotationally in either direction (co-rotated or counter-rotated). Other suitable implementations for a layering device 58 are possible including, for example, a blade or a device that dispenses build material directly over the work area in a layer.

The characteristics of warming lamp 14 and fusing lamps 16-20 may vary depending on characteristics of the build material and fusing agent (and other fusing process parameters). A lower color temperature warming lamp 14 and higher color temperature fusing lamps 16-20 may be desirable to better match the spectral absorption of build material not treated with a fusing agent and build material treated with a fusing agent, respectively, for increased energy transfer from the lamps to the build material. For example, a single warming lamp 14 operating in the range of 800K to 2150K with a baffle 12 and reflector 28 (FIGS. 1-4) described above may be used to achieve the desired level of power absorption for effectively preheating an untreated white PA 12 powdered build material 68, and three fusing lamps 16-20 each operating in the range of 2400K to 3500K with a reflector 30 (FIGS. 1-4) may be used to achieve the desired level of power absorption for effectively fusing the same build material treated with a black liquid fusing agent 70 (FIG. 16). A black fusing agent absorbing nearly all of the radiant energy emitted by the higher color temperature fusing lamps helps fuse the treated build material without also fusing the surrounding untreated build material.

Figure 14:
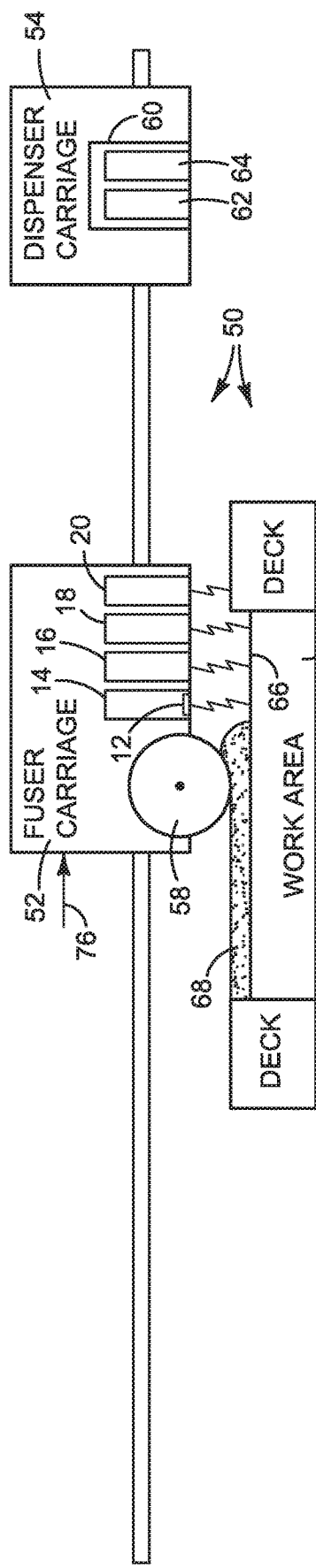

Work area 66 represents any suitable structure to support or contain build material for fusing, including underlying layers of build material and in-process slice and other object structures. For a first layer of build material, for example as shown in FIG. 14, work area 66 may be formed on the surface of a platform 72 that moves up and down to accommodate the layering process. For succeeding layers of build material work area 66 may be formed on an underlying object structure which may include unfused and fused build material.

In FIGS. 12 and 13, a ribbon 74 of build material powder 68 has been deposited along a deck adjacent to work area 66. Layering roller 58 is deployed as fuser carriage 52 moves to the right in a first pass, as indicated by motion arrows 76, and warming lamp 14 preheats the powder 68 in supply ribbon 74. Fusing lamps 16-20 may contribute a small amount of heat to untreated powder 68. However, as noted above, in this example the fusing lamps are configured to optimize heating treated build material, and thus heat untreated build material poorly.

Figure 15:
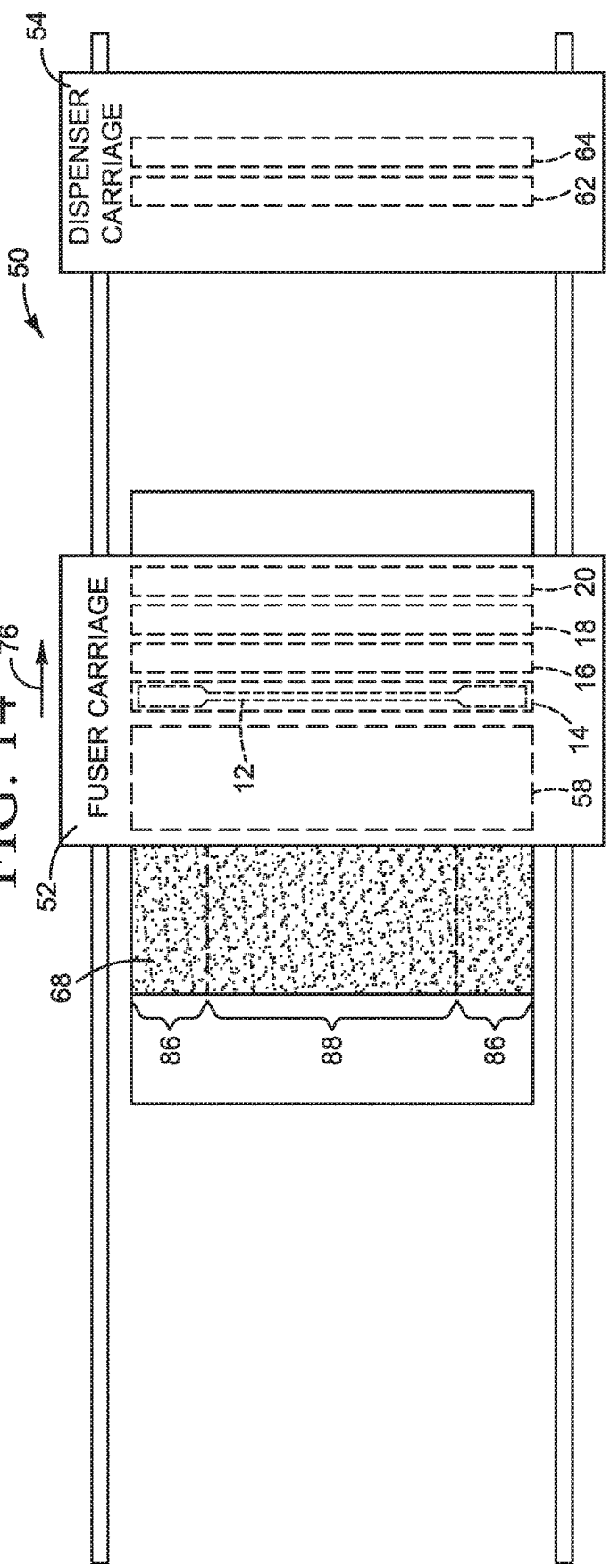

In FIGS. 14 and 15, as fuser carriage 52 continues moving to the right in the first pass, the lamps heat build platform 72 (or underlying base layers or object structure in subsequent layers) while roller 58 layers build material 68 over platform 72. As detailed above with reference to FIG. 9, the irradiance of lamp 14 on work surface 66 is greater across outer parts 86 of work area 66 compared to inner part 88 of work area 66, in the areas corresponding to the ends of baffle opening. The radiant exposure of build material 68 in work area 66 is also greater along outer parts 86 both due to the higher irradiance and because those parts of the work area experience a longer exposure time from the wider exposure window as lamp 14 moves over work area 66.

Figure 20:
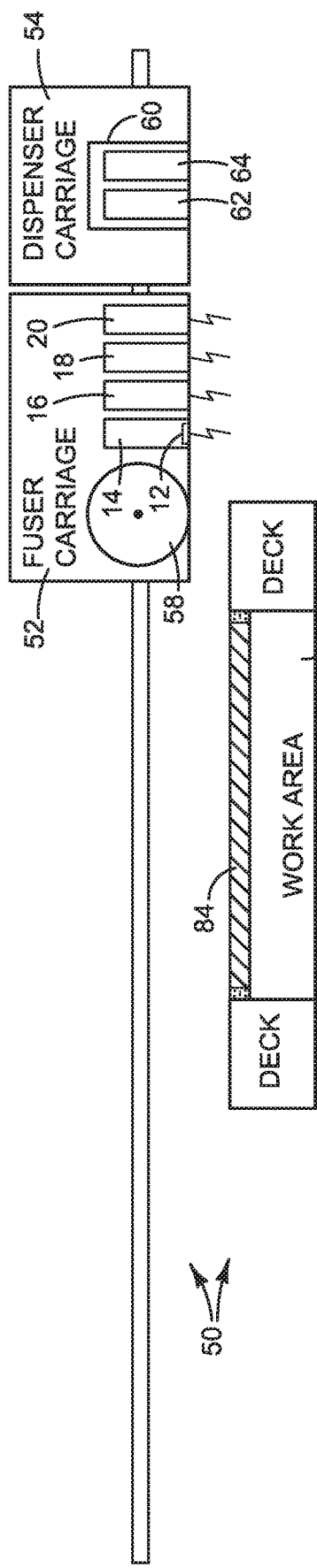
Figure 21:
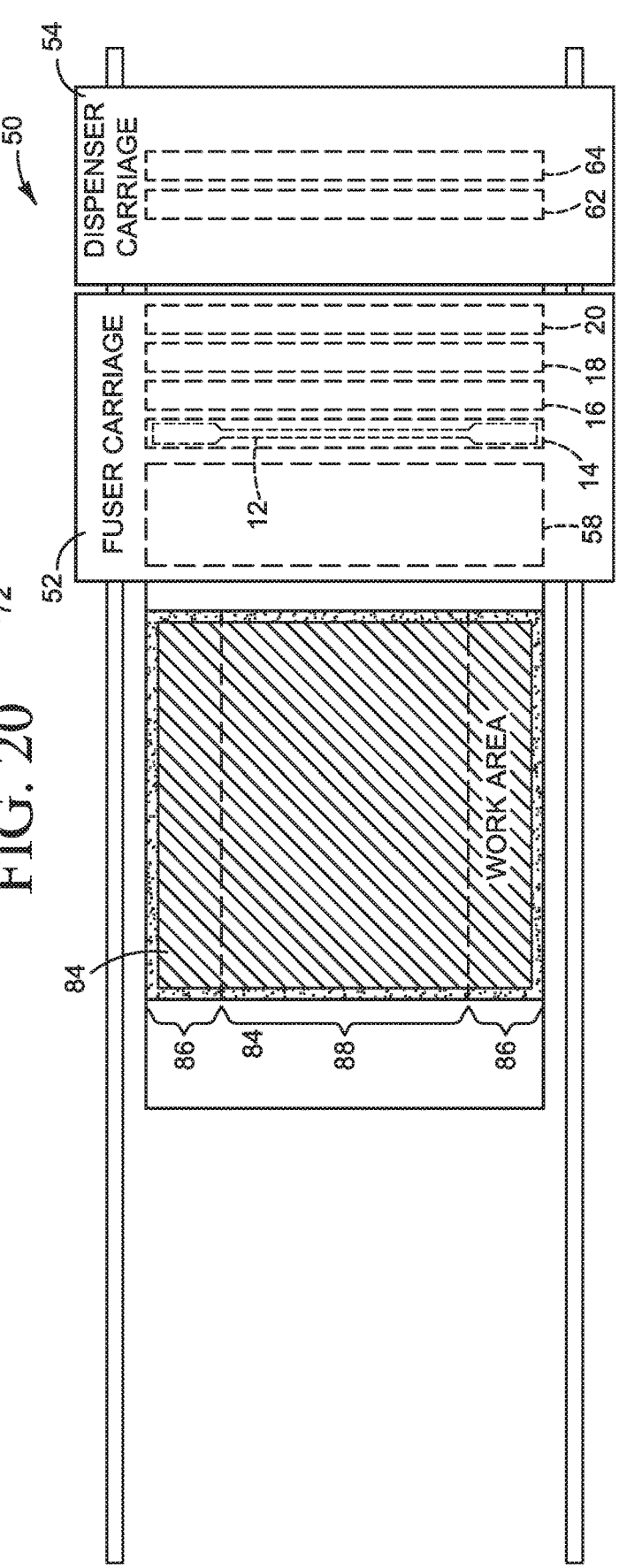

In FIGS. 16 and 17, as fuser carriage 52 moves to the left in a second pass, indicated by motion arrows 78, layering roller 58 is retracted and warming lamp 14 is on to preheat unfused build material 68. Also in this second pass, dispenser carriage 54 follows fusing carriage 52 over work area 66 and dispenser 62 dispenses a fusing agent 70 on to the build material in a pattern 80 corresponding to an object slice. In FIGS. 18 and 19, as dispenser carriage 54 moves to the right in a third pass, indicated by motion arrows 76, dispenser 64 dispenses a detailing agent 82 on to build material 68. Also in this third pass, fusing carriage 52 follows dispenser carriage 54 with fusing lamps 16-20 on to fuse patterned build material, to form fused material 84. In FIGS. 20 and 21, fuser carriage 52 and dispenser carriage 54 have reached the right side of work area 66. In one example, fuser carriage 52 returns to the left side of work area 66 to begin forming the next layer and the sequence of operations may continue for each succeeding layer of build material, slice by slice, to complete the object.

FIGS. 12-21 illustrate just one example of a fusing system 50 and fusing sequence. Other suitable fusing systems and sequences are possible.

The examples shown in the figures and described above illustrate but do not limit the patent, which is defined in the following Claims.

"A", "an" and "the" used in the claims means at least one. For example, "a baffle" means one or more baffles and subsequent reference to "the baffle" means the one or more baffles.

The invention claimed is:

1. An additive manufacturing machine that includes a lighting assembly comprising a carriage movable over a work area and carrying:
   a first lamp having a first color temperature to irradiate build material in the work area as the carriage moves over the work area;
   a second lamp having a second color temperature greater than the first color temperature to irradiate build material in the work area as the carriage moves over the work area; and
   a baffle having an opening under the first lamp to pass a first amount of light emitted from the first lamp along an inner part of the work area and to pass a second amount of light greater than the first amount emitted from the first lamp along an outer part of the work area.

2. The machine of claim 1, where the lighting assembly comprises a reflector covering the first lamp opposite the baffle to reflect light emitted by the first lamp toward the baffle.

3. The machine of claim 2, where the baffle forms a dumbbell shaped opening such that the first, greater amount of light passes through the ends of the opening and the second, lesser amount of light passes through the middle of the opening.

4. The machine of claim 3, where:
   the first lamp comprises a single first lamp with a color temperature of 800K to 2150K; and
   the second lamp comprises multiple second lamps each with a color temperature of 2400K to 3500K.

5. The machine of claim 1, where the carriage carrying the lamps is a first carriage and the machine includes a second carriage movable over the work area and carrying a dispenser to dispense a liquid fusing agent as the second carriage moves over the work area.

6. The machine of claim 5, where the first carriage carries a layering device to layer build material over the work area as the first carriage moves over the work area.

7. A lighting assembly for an additive manufacturing machine that includes a work area to support or contain build material for fusing, the lighting assembly comprising:
   a warming lamp to irradiate build material in the work area as the warming lamp is moved over the work area;
   a fusing lamp to irradiate build material in the work area as the fusing lamp is moved over the work area; and
   a baffle having a dumbbell shaped opening therein near the warming lamp such that a first, greater amount of light emitted from the warming lamp passes through each end of the opening and a second, lesser amount of light emitted from the warming lamp passes through a middle part of the opening between the ends.

8. The assembly of claim 7, where:
   the warming lamp is a single warming lamp; and
   the fusing lamp comprises multiple fusing lamps.

9. The assembly of claim 7, where the warming lamp has a first color temperature and the fusing lamp has a second color temperature greater than the first color temperature.

10. The assembly of claim 7, where the warming lamp and the fusing lamp are movable together over the work area.

11. The assembly of claim 10, comprising a single carriage carrying the warming lamp and the fusing lamp.

* * * * *